April 30, 1968   P. CHAMBERS   3,380,695
MEANS FOR POSITIONING A LOAD ON A CARRIER
Filed March 7, 1966   2 Sheets-Sheet 1

INVENTOR
Philip Chambers

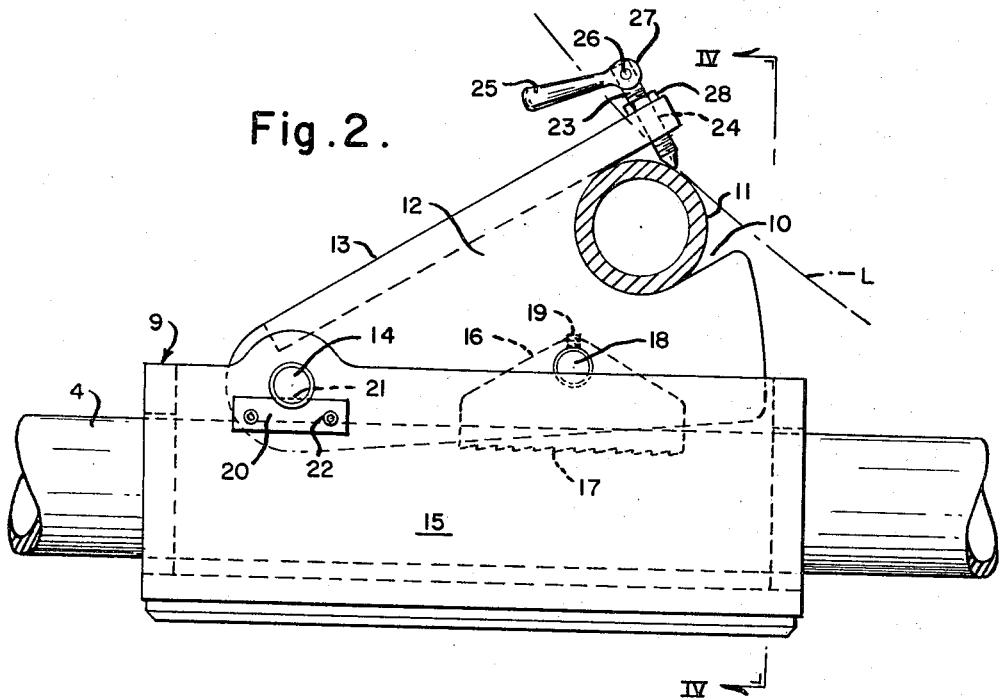
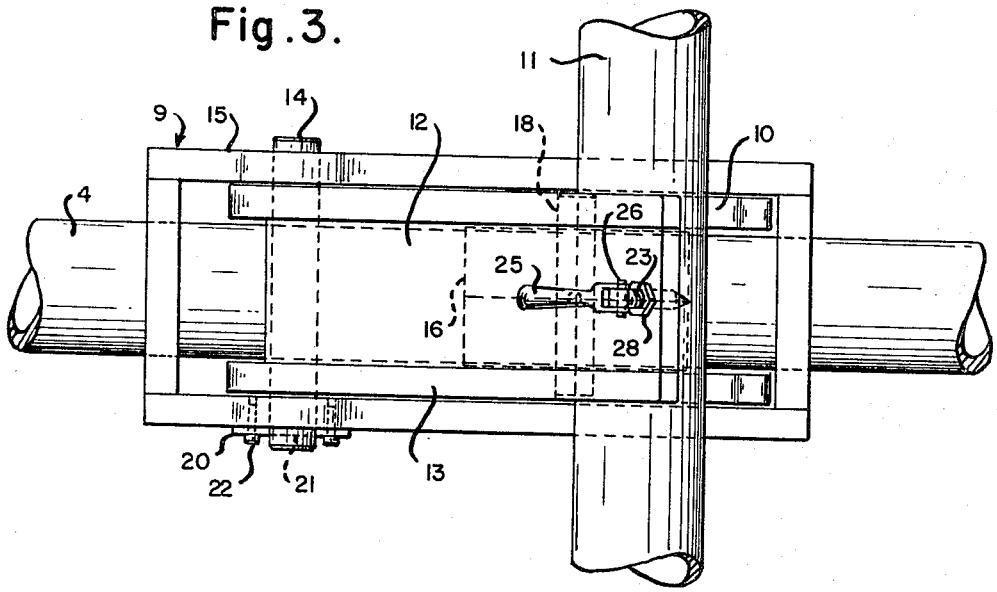

United States Patent Office 3,380,695
Patented Apr. 30, 1968

3,380,695
MEANS FOR POSITIONING A LOAD
ON A CARRIER
Philip Chambers, P.O. Box 42, Butler, Pa. 16001
Filed Mar. 7, 1966, Ser. No. 532,458
4 Claims. (Cl. 248—119)

ABSTRACT OF THE DISCLOSURE

In combination with a generally horizontal carrier such as a vehicle bed, generally parallel generally horizontal spaced apart elongated members, means for maintaining at least one of said members in position on the carrier, generally parallel generally horizontal spaced apart elongated load engaging elements disposed substantially at right angles to said members and connecting devices connecting together said members and load engaging elements, the connecting devices being adjustably positionable along said members and being maintained in desired adjusted positions by the weight of the load bearing on the load engaging elements. The connecting devices may have a hollow body portion through which an elongated member passes and a gripper for gripping the elongated member, the gripper being carried by the body portion for relative movement therebetween enabling the gripper to assume gripping position with respect to the elongated member upon application of the weight of the load bearing on the load engaging elements. The gripper may be pivotally mounted on the body of the connecting device and may comprise a mounting member and a contact member carried by the mounting member for relative movement therebetween enabling the contact member to assume proper contacting position with respect to the elongated member when the gripper moves to gripping position. The contact member may be pivotally mounted on the mounting member. The connecting device may have a serrated face portion for positively gripping an elongated member. The connecting device may have a slotted portion receiving a load engaging element and means for maintaining the load engaging element in the slotted portion, which means may comprise screw means threaded through a portion of the connecting device and bearing against a portion of the load engaging element facing outwardly of the slot.

This invention relates to means for positioning a load on a carrier. It has to do with load-positioning means especially useful in positioning on carriers such as truck trailers and freight cars loads of generally cylindrical shape. This invention is in the nature of an improvement over the invention of my copending application Ser. No. 530,881, filed Mar. 1, 1966.

My said copending application discloses means for positioning a load on a carrier comprising generally parallel spaced apart elongated members, means for maintaining at least one of said members in position on a carrier, generally parallel spaced apart elongated elements disposed substantially at right angles to such members and fastening means for fastening together the members and elements in relatively adjusted positions for positioning a load on the carrier. The fastening means of said application include wedge and screw means manually operable to fasten the fastening means to the elongated members and frictionally fasten together the elongated members, elongated elements and fastening means.

According to my present invention the above mentioned manually operable means are rendered unnecessary and in place thereof I utilize connecting devices connecting together the elongated members and elements, such devices being adjustably positionable along the elongated members and maintained in adjusted position by the weight of the load bearing on the elongated elements which engage the load.

I provide means for positioning a load on a carrier comprising generally parallel spaced apart elongated members, means for maintaining at least one of said members in position on a carrier, generally parallel spaced apart elongated load engaging elements disposed substantially at right angles to said members and connecting devices connecting together said members and load engaging elements, the connecting devices being adjustably positionable along said members and being maintained in desired adjusted positions by the weight of the load bearing on the load engaging elements.

My means for positioning a load on a carrier may have a connecting device having a hollow body portion through which an elongated member passes and a gripper for gripping the elongated member, the gripper being carried by the body portion for relative movement therebetween enabling the gripper to assume gripping position with respect to the elongated member upon application of the weight of the load bearing on the load engaging elements. The gripper may be and preferably is pivotally mounted on the body of the connecting device.

The gripper desirably comprises a mounting member and a contact member carried, as by a pivotal mounting, by the mounting member for relative movement therebetween enabling the contact member to assume proper contacting position with respect to the elongated member when the gripper moves to gripping position. The connecting device may have a serrated face portion for positively gripping an elongated member.

My means for positioning a load on a carrier preferably has a connecting device having a slotted portion receiving a load engaging element together with means for maintaining a load engaging element together with means for maintaining the load engaging element in the slotted portion. Such means may comprise screw means threaded through a portion of the connecting device and bearing against a portion of the load engaging element facing outwardly of the slot.

Other details, objects and advantages of the invention will become apparent as the following description of a present preferred embodiment thereof proceeds.

In the accompanying drawings I have shown a present preferred embodiment of the invention in which:

FIGURE 2 is an enlarged fragmentary view, partly in transverse cross section and partly in elevation, of a portion of my load-positioning means;

FIGURE 3 is a top plan view of the structure shown in FIGURE 2; and

Figure 4:
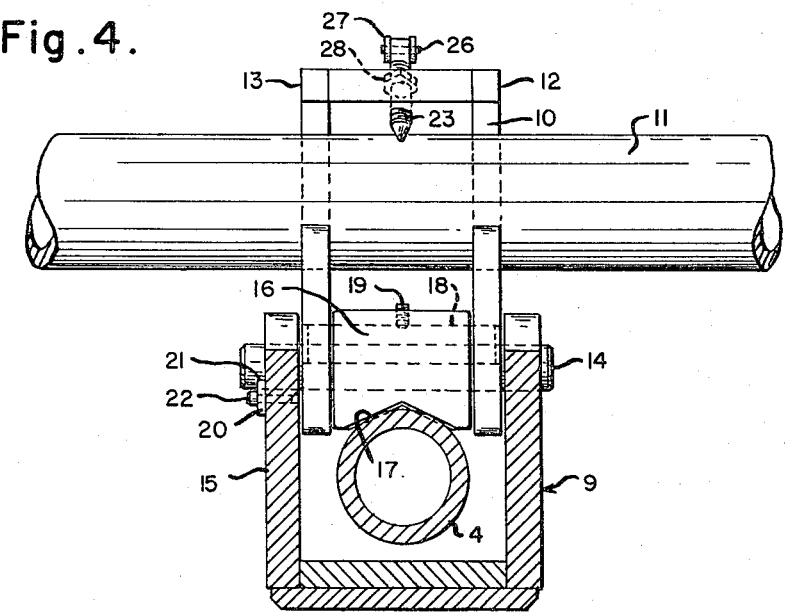
FIGURE 4 is a cross-sectional view taken on the line IV—IV of FIGURE 2.

Referring now more particularly to the drawings, reference numeral 2 designates generally the bed of a truck trailer adapted to be hauled by an automotive tractor. The bed has a flat top and has applied to both side faces sockets 3 normally used for holding upright stakes or side panels. The sockets 3 are in opposed pairs.

Figure 1:
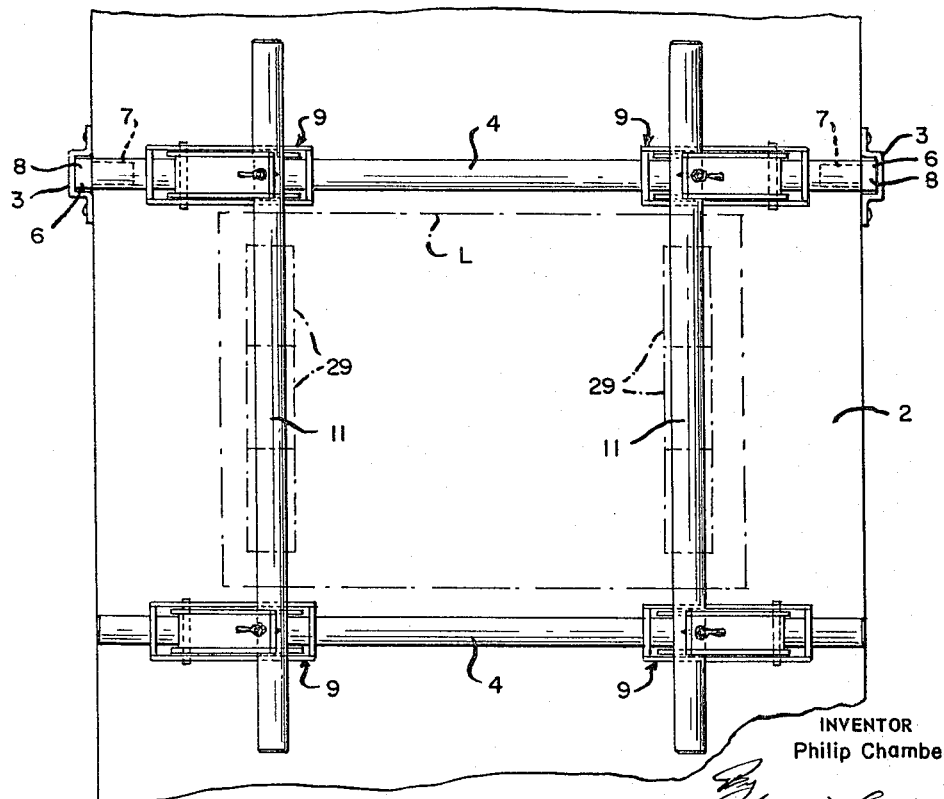
FIGURE 1 is a plan view of my load-positioning means applied to a truck trailer bed, the load, illustrated as a coil of steel strip, being shown in outline by chain lines.

Arranged transversely of the bed 2 are two generally parallel spaced apart elongated members 4 in the form of pipes whose length is substantially equal to the width of the bed 2. The pipe 4 which is nearer the top of the figure in FIGURE 1 is positioned on the bed 2 by generally L-shaped positioning members 6, one at each end thereof. Each of the members 6 has a horizontally extending plug-like portion 7 fitting snugly on the end of the pipe and an upright portion 8 fitting in one of the sockets 3. Thus that pipe 4 is maintained in fixed position on the bed 2. The generally L-shaped positioning members are shown in more detail in my said copending application.

The pipe 4 which is nearer the bottom of the figure in FIGURE 1 is a duplicate of the first described pipe 4 but need not be positioned by means such as the members 6 although if the size of the load permits, i.e., if the pipe 4 which is nearer the bottom of the figure in FIGURE 1 is in transverse alignment with an opposed pair of sockets 3, it may be so positioned. The space between the pipes 4 is determined by the dimension of the load longitudinally of the bed.

Each of the pipes 4 has two connecting devices 9 through which the pipe passes so that there are four such connecting devices altogether. The two connecting devices on each pipe 4 face toward each other as shown in FIGURE 1. The structure of the connecting devices is clearly shown in FIGURES 2, 3 and 4. Since all four connecting devices are identical description of one will suffice for all. Each connecting device is adjustably positionable along the pipe 4 to which it is applied and is maintained in desired adjusted position by the weight of the load as will presently be described.

Generally parallel spaced apart elongated load engaging elements 11, each in the form of a pipe, have their axes at right angles to the axes of the pipes 4. Thus if the pipes 4 extend transversely of the truck bed the pipes 11 extend longitudinally thereof. Each of the pipes 11 is received in slotted portions 10 of mounting members 12 of grippers 13 pivotally mounted by pivot pins 14 on hollow body portions 15 of the connecting devices 9 adjacent one side of the truck bed. Pivotally connected by a pivot pin 18 with each mounting member 12 and constituting part of the corresponding gripper 13 is a contact member 16 having a serrated face portion 17. The mounting member 12 of each gripper 13 is bifurcated as shown in FIGURE 4, the corresponding contact member 16 being disposed between the legs thereof. A set screw 19 is threaded into each contact member 16 and engages the corresponding pivot pin 18, holding the pivot pin in place. The serrated under face of each contact member 16 is formed concavely or as a V-shaped notch as shown in FIGURE 4 to effectively engage the upper portion of the corresponding elongated member or pipe 4. Each pivot pin 14 is maintained in place by a keeper 20 entering a slot 21 in the pivot pin and fastened to the outer face of the corresponding body portion 15 by screws 22 as shown in FIGURE 4.

I provide means for maintaining each pipe 11 in the slotted portion 10 of each gripper receiving it, such means as shown being in the form of a screw 23 threaded through a portion of the mounting member 12 of the gripper 13 at 24 and bearing against a portion of the pipe 11 facing outwardly of the slot 10 as shown in FIGURE 2. For easy manual turning of each screw 23 the screw is provided with a handle 25 pinned to the screw by a pivot pin 26 passing through the outer end of the screw and through the bifurcated inner end 27 of the handle. A jam nut 28 is provided for maintaining the screw 23 in adjusted position.

The load is indicated by chain lines L in FIGURES 1 and 2, being illustrated as in the form of a coil of steel strip. Its flat faces are parallel to the pipes 4 and its rounded periphery bears on the pipes 11 as shown in FIGURE 2, which pipes may be provided with sleeves 29 of protective material such as rubber as shown in FIGURE 1. A holddown device, conventionally in the form of a chain, not shown in the present application but shown in my said copending application, may pass through the eye of the coil and have its ends connected with the pipes 4 with a pad of protective material interposed between the holddown device and the coil. Also a pad of protective material may be disposed on the truck bed serving as a seat for the coil.

The weight of the coil bearing on the pipes 11 presses the grippers 13 downwardly causing the contact members 16 of the grippers to bite into the pipes 4, thus obviating the need for any means requiring separate operation as in my said copending application for fastening the connecting devices 9 to the pipes 4. Thus I provide an extremely simple, inexpensive and easy to operate means for positioning a load on a carrier in which the connecting devices for maintaining the load engaging elements in fixed position relatively to the transverse elongated members are maintained in position by the weight of the load.

While I have shown and described a present preferred embodiment of the invention it is to be distinctly understood that the invention is not limited thereto but may be otherwise veriously embodied within the scope of the following claims.

I claim:
1. In combination with a generally horizontal carrier such as a vehicle bed, generally parallel generally horizontal spaced apart elongated members, means for maintaining at least one of said members in position on the carrier, generally parallel generally horizontal spaced apart elongated load engaging elements disposed substantially at right angles to said members and connecting devices connecting together said members and load engaging elements, the connecting devices being adjustably positionable along said members and being maintained in desired adjusted positions by the weight of the load bearing on the load engaging elements, a connecting device having a hollow body portion through which an elongated member passes and a gripper for gripping the elongated member, the gripper being carried by the body portion for relative movement therebetween enabling the gripper to assume gripping position with respect to the elongated member upon application of the weight of the load bearing on the load engaging elements, the gripper comprising a mounting member and a contact member carried by the mounting member for relative movement therebetween enabling the contact member to assume proper contacting position with respect to the elongated member when the gripper moves to gripping position.

2. The combination claimed in claim 1 in which the contact member is pivotally mounted on the mounting member.

3. In combination with a generally horizontal carrier such as a vehicle bed, generally parallel generally horizontal spaced apart elongated members, means for maintaining at least one of said members in position on the carrier, generally parallel generally horizontal spaced apart elongated load engaging elements disposed substantially at right angles to said members and connecting devices connecting together said members and load engaging elements, the connecting devices being adjustably positionable along said members and being maintained in desired adjusted positions by the weight of the load bearing on the load engaging elements, a connecting device having a hollow body portion through which an elongated member passes and a gripper for gripping the elongated member, the gripper being carried by the body portion for relative movement therebetween enabling the gripper to assume gripping position with respect to the elongated member upon application of the weight of the load bearing on the load engaging elements, the gripper being pivotally mounted on the body of the connecting device and comprising a mounting member and a contact member carried by the mounting member for relative movement therebetween enabling the contact member to assume proper contacting position with respect to the elongated member when the gripper moves to gripping position.

4. The combination claimed in claim 3 in which the contact member is pivotally mounted on the mounting member.

References Cited

UNITED STATES PATENTS

| | | |
|---|---|---|
| 308,005 | 11/1884 | Steinebrei. |
| 1,634,804 | 7/1927 | Stansfield _____ 211—182 |
| 2,233,458 | 3/1941 | Segre. |
| 2,628,047 | 2/1953 | Herder et al. _____ 248—23 |
| 2,956,517 | 10/1960 | Chapman et al. __ 248—119 XR |

ROY D. FRAZIER, *Primary Examiner.*

R. P. SEITTER, *Assistant Examiner.*